Jan. 21, 1941.   J. R. MORGAN   2,229,468
BICYCLE
Filed May 6, 1937   3 Sheets-Sheet 2
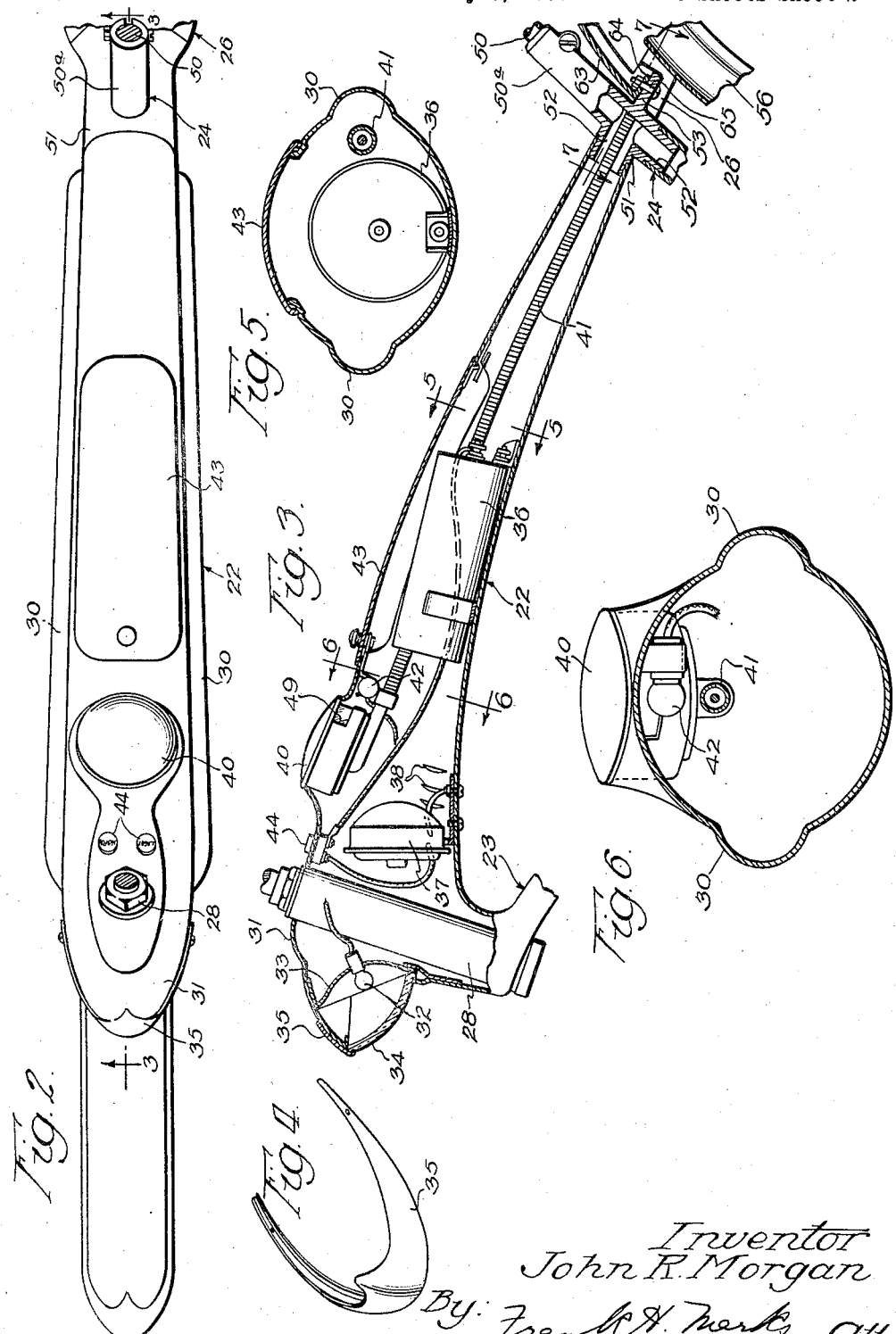
Inventor
John R. Morgan
By: Frank H. Marks, Atty.

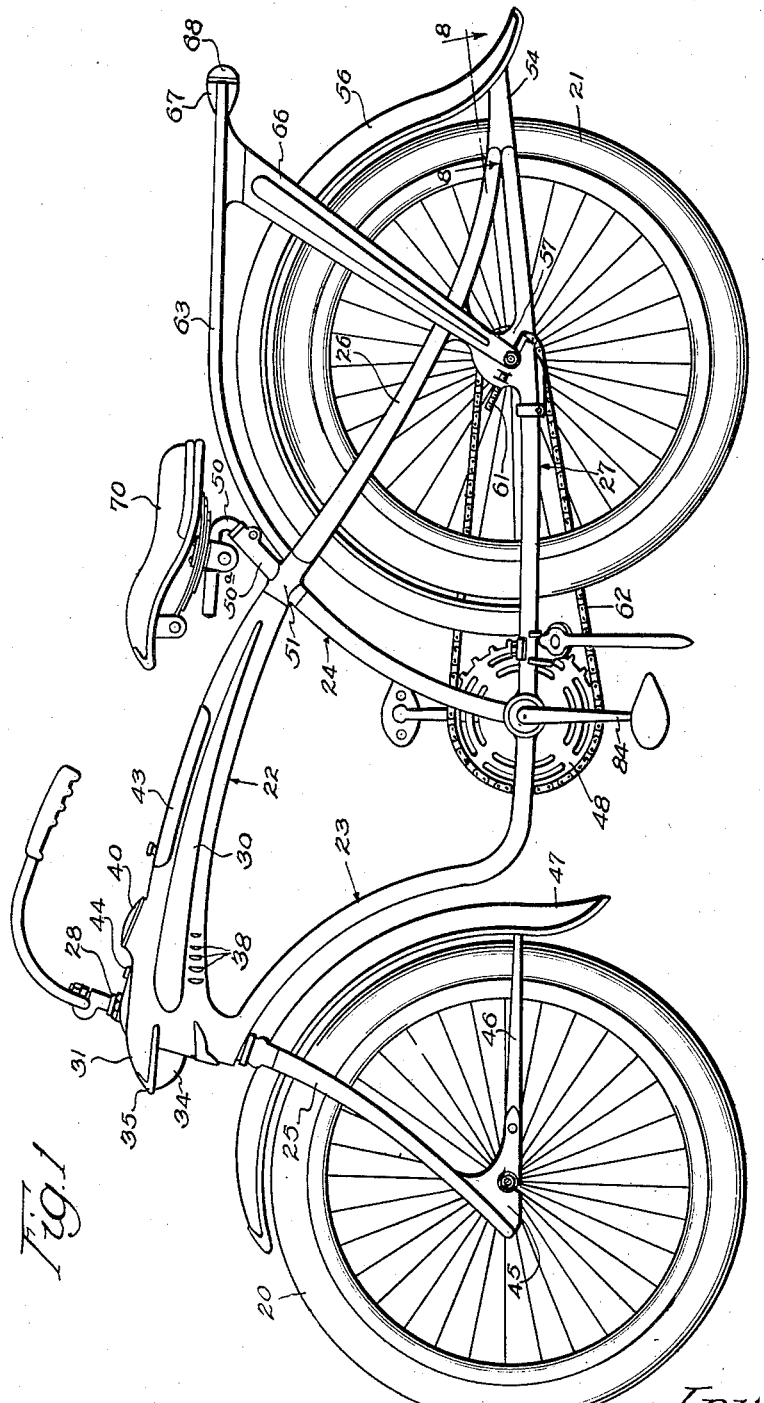

Jan. 21, 1941. J. R. MORGAN 2,229,468
BICYCLE
Filed May 6, 1937 3 Sheets-Sheet 3
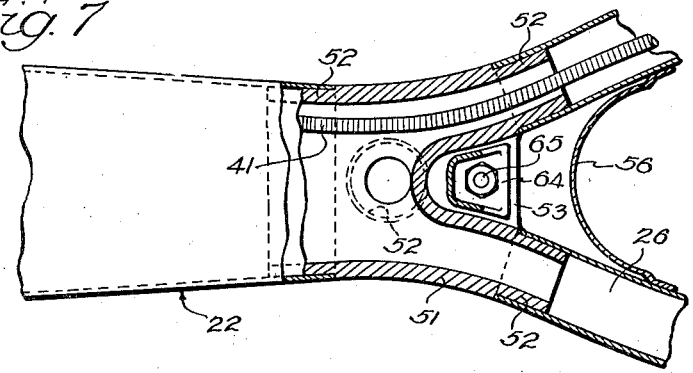
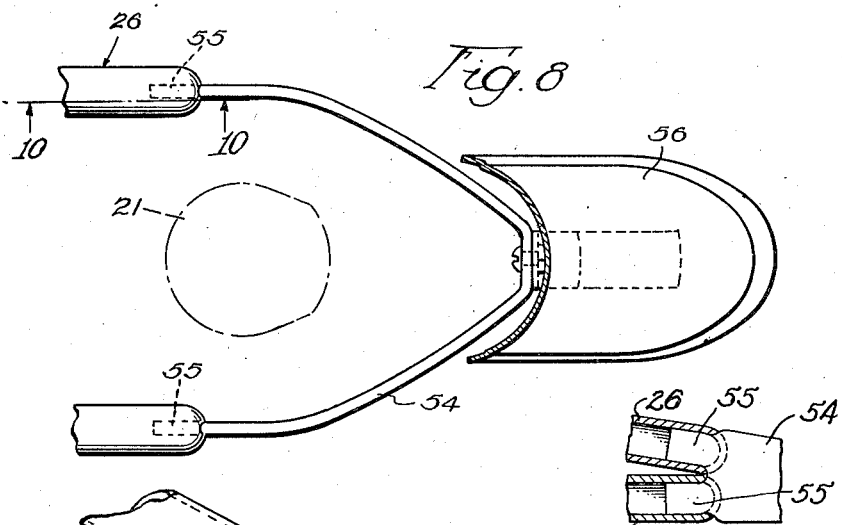
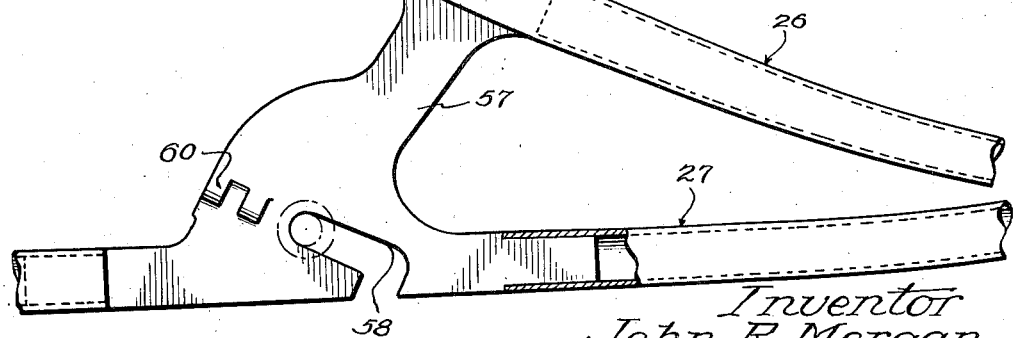
Inventor
John R. Morgan
By Frank H. Marks, Atty.

Patented Jan. 21, 1941

2,229,468

UNITED STATES PATENT OFFICE 2,229,468

BICYCLE

John R. Morgan, Oak Park, Ill., assignor to Sears, Roebuck and Co., Chicago, Ill., a corporation of New York Application May 6, 1937, Serial No. 141,077

6 Claims. (Cl. 280—281)

This invention relates to bicycles, and has for its principal object the provision of a bicycle having a novel streamlined construction of great strength but of light weight, the elements being arranged and related to carry the rider in a comfortable, easy-pedalling position.

It is also an object to provide a bicycle in which the top frame member is enlarged in a novel manner to provide a casing for such accessories as a headlight, speedometer, and horn as well as to provide an enclosed space for an electric battery to operate the electrical accessories and for tools.

Another object is to provide a bicycle having a frame construction supported on the wheels in a novel manner and comprising frame members in a new interrelation providing great strength and rigidity for the frame.

More specifically it is an object to provide a bicycle having a novel frame construction including a top member sweeping rearwardly and downwardly, to provide a streamline effect, an upper fork for the rear wheel constituting a continuation of the lines of the top member, a lower rear fork meeting the upper fork at a point adjacent the rear edge of the rear wheel, and a front fork extending downwardly and forwardly to a point in front of the axis of the front wheel.

Another object is to provide a bicycle having a rear frame member extending upwardly and rearwardly substantially on an arc concentric with the rear wheel to a point where the top frame member meets the upper rear fork, thereby locating the seat post well toward the rear of the bicycle in an easy pedalling position.

Other objects and advantages will become apparent from the following description taken in connection with the accompanying drawings, in which:

Figure 1 is a side elevational view of a bicycle embodying the features of the invention.

Fig. 2 is a fragmentary plan view of the bicycle shown in Fig. 1.

Fig. 3 is a longitudinal vertical section taken on the line 3—3 of Fig. 2.

Fig. 4 is a perspective view of a part used in connection with the headlight.

Fig. 5 is a transverse vertical section taken on the line 5—5 of Fig. 3.

Fig. 6 is a transverse vertical section taken on the line 6—6 of Fig. 3.

Fig. 7 is a fragmentary longitudinal section taken on the line 7—7 of Fig. 3.

Fig. 8 is a fragmentary horizontal section taken on the line 8—8 of Fig. 1.

Fig. 9 is an enlarged side elevation of the forks for the rear wheel.

Fig. 10 is a fragmentary sectional view taken as indicated by the line 10—10 in Fig. 8.

A bicycle embodying the features of the invention is designed to have a streamlined appearance and, at the same time, great strength as well as easy riding qualities. To this end, it has a frame comprising generally a plurality of members so shaped and united and so related to the wheels that the suggestion of strength and the ability to operate the bicycle at high speeds with little effort is implied. To this end, the frame includes a top member of relatively large cross section adjacent the front end and tapering rearwardly. The top member sweeps rearwardly and downwardly, with a fork for the rear wheel constituting an extension thereof, to a point adjacent the rear edge of the rear wheel, while a fork for the front wheel extends downwardly and forwardly with the axis for the front wheel located rearwardly of the lower end of said fork. A lower frame member extends from the upper end of the front wheel fork downwardly on an arc about the axis of the front wheel, and thence horizontally rearwardly to meet the rear fork and in effect form a continuation thereof, at a point adjacent the rear edge of the rear wheel. From the meeting point of the lower frame member and the lower rear fork, a rear frame member extends upwardly and rearwardly, substantially on an arc concentric with the rear wheel, to a point where the top member meets the upper rear fork, thereby locating the seat post for the saddle well toward the rear of bicycle in an easy-pedalling position.

The top member has a portion projecting forwardly of the steering post and of a generally rounded form in which portion a headlight is incorporated in such manner as to throw light forwardly and downwardly. The top member is hollow and the large cross-section thereof in the fore part thereof provides space for accessories. Thus, the top member may be utilized as a container for a battery and for tools, and a distance indicating device and a horn may be mounted therein.

As shown in the drawings, the bicycle comprises a frame supported on a front wheel 20 and a rear wheel 21. The frame comprises a top member 22, a lower member 23, a rear member 24, a front fork 25, an upper rear fork 26, a lower rear fork 27, and a relatively short front member 28 in which the front fork is journalled. The top member 22 is hollow and of a somewhat oval cross section with the longer diameter horizontal, the cross-sectional area being relatively large at the front end and tapering rearwardly. Along the respective sides of the top member, a pair of rounded ribs or bulges 30 may be formed, which correspondingly taper toward the rear. The top member slopes gently and sweepingly downwardly toward the upper rear fork 26 which constitutes a continuation of the sloping top member and of the tapering thereof, thus accentuating the streamline effect.

At the front end, the top member has a forwardly extending projection 31 in front of the front frame member 28 (see Figs. 1, 2 and 3) which is generally rounded or ogival in form with the lower half thereof cut away. Within the projection, an electric headlight 32 and a reflector 33 therefor are mounted. Filling the cut-away area is a lens or glass 34 to complete the shape of the projection 31. The glass 34 is preferably retained in place by a strip 35 extending around the lower edge of the projection 31 and secured thereto as by screws. The strip 35 may be so shaped as to enhance the decorative effect, the preferred shape being illustrated in Fig. 4. Thus, the upper half of the projection 31 constitutes a shade to throw the light forwardly and downwardly.

The large cross-sectional area of the top member provides suitable enclosed space for carrying accessories. Thus, ample space for tools is provided, and a battery 36 to operate the various electrical devices may be located within this space with the wiring concealed therewithin. A horn 37 may be mounted within the top member with slots 38 along the respective sides of the top member to permit egress of the sound. The top surface of the top member provides a suitable location for a distance indicating device or speedometer 40, the dial thereof being readily observable by the rider. This device may be either of the types indicating total distance travelled, the rate of speed, or both. To operate this device, an operating cable 41 may extend rearwardly within the top member for concealment and thence downwardly within the upper rear fork 26 to a point adjacent the rear wheel for operative connection therewith. To illuminate the dial of the distance indicating device 40, a light 42 may be mounted within the top member adjacent an aperture 49 in the casing of the device 40, the light likewise illuminating the interior of the top member to facilitate locating tools therein. The aperture 49 may be covered with a transparent material such as isinglass to protect the device 40 from dust. Access to the interior of the top member may be had through a detachable cover 43 preferably located rearwardly of the distance indicating device 40, while switch buttons 44 to operate the horn and the lights may be mounted in the top surface in front of the device 40. The upper surface of the top member thus is a conveniently arranged instrument panel and gives the bicycle a neat, well-equipped appearance.

The top member, because of its prominence in obtaining the streamline appearance, and because of its strength, is apertured at its upper and lower surfaces to receive the front member 28 and permit the latter to extend through the top member. Thus, the construction of the top member eliminates the need for the usual head casting to provide a rigid connection with the front member. The enlargement of the top member at the front also enables it to meet and blend in with the front end of the lower member 23 and thereby conceal the front member 28 except for small portions at its upper and lower ends, as will be noted in Figs. 1 and 3.

The front fork 25 is rotatably mounted in the front member 28 and extends forwardly and downwardly in a moderate curve to terminate forwardly of the axis of the front wheel. To support the fork 25 on the wheel, a pair of triangularly shaped weblike members 45 are attached edgewise to the lower ends of the fork to extend rearwardly therefrom, and are slotted to receive the axle of the front wheel. The members 45 also extend rearwardly of the front wheel axle to support the legs of a U-shaped bracket 46 to the base of which the lower end of a mud-guard 47 may be attached, the mud-guard passing through the top of the front fork and being supported thereby.

The lower member 23 preferably extends arcuately about the front wheel from the union thereof with the top member and thence rearwardly in a substantially horizontal direction to the front end of the lower rear fork 27, the latter forming a continuation thereof. From the union of the lower member 23 and the lower rear fork 27, the rear member 24 extends upwardly, the union of these three parts being enlarged to receive the usual bearings for a pedal sprocket 48. The rear member 24 extends upwardly and rearwardly, substantially on an arc concentric with the rear wheel, to the point where the top member 22 and the upper rear fork 26 meet.

The top member 22, the rear member 24, and the upper rear fork are rigidly connected by means of a cluster casting 51 provided with a plurality of shouldered lugs 52 telescoping into the respective members and the arms of the rear fork 26, the ends thereof abutting the shoulders on the lugs to provide a smooth exterior. The casting 51 comprises a body portion having an oval cross-section, with its longest diameter horizontal, and extending forwardly to provide the lug fitting into the oval end of the top member 22. The body of the casting extends rearwardly in bifurcated form to provide the two lugs for the respective arms of the rear fork 26, while a downwardly extending lug is provided for the rear member 24. Between the two lugs over which the two arms of the rear fork 26 telescope, a flat web 53 is provided to stiffen the casting. The casting also has an upwardly and rearwardly extending tubular portion 50ª to receive and support a seat post 59 mounting a saddle 70, the tubular portion 50ª constituting in effect, a continuation of the rear member 24. The casting 51 is hollow throughout, and the cable 41 for the distance indicating device 40, which extends within the top member 22, passes through the cluster casting and into one of the arms of the rear fork 26.

As mentioned above, the two rear forks 26 and 27 meet at a point adjacent the rear edge of the rear wheel. To rigidly connect the ends of the two forks, a U-shaped member 54 (see Figs. 1 and 8) extends around the periphery of the rear wheel. Each end of the member 54 has a pair of projections 55 entering the ends of the respective forks, which ends are in edge-to-edge relation, so that the member 54 constitutes a continuation of the two forks. The member 54 thus secures the ends of the two forks together and holds the two sides of each fork in spaced relation to receive the rear wheel therebetween.

The U-shaped member 54 also serves as a support for the rear end of a mud-guard 56. The latter extends arcuately over the upper portion of the rear wheel within the two rear forks with the front end of the mud-guard located within the lower rear fork 27. The rear end of the mud-guard is preferably curved rearwardly, as will be noted in Fig. 1, to contribute to the streamline effect.

To give strength to the assembly of the two rear forks, they are rigidly connected at a point spaced from their meeting point and the member 54. To this end, on each side of the forks, a web 57 (Fig. 9) is provided with extends across the angle between the forks and is inserted into the tubular pieces of which the rear forks are constructed. The webs 57 are located at the axis of the rear wheel so that the stiffening effect of the webs occurs at the point where the load is supported. Thus, the webs 57 are notched as at 58 to receive the rear wheel axles. The webs are also pressed to provide screw-receiving portions 60, in which screws 61 (see Fig. 1) are threaded to adjust the position of the wheel axle in the notch 58 and thereby adjust the tension on the usual chain 62 connecting the pedal sprocket 48 and a sprocket (not shown) on the rear wheel.

The preferred embodiment may also be equipped with a luggage carrier, the lines of which conform to the streamline appearance of the bicycle as a whole. Thus, the luggage carrier comprises a luggage carrying frame 63 (see Fig. 1) which extends horizontally rearwardly from a point over the axis of the rear wheel. From that point forwardly, the frame 63 follows the curvature of the wheel with its forward end located immediately in the rear of the rear frame member 24, where it is rigidly secured to the cluster casting 51. To this end, the front end of the luggage carrying frame 63 has a transverse wall 64 (see Fig. 3) at its end, which is shaped to conform to and abut the top surface of the web 53 between the two lugs 52 for the upper rear fork, and is rigidly connected thereto by a bolt 65.

The rear end of the luggage carrying frame 63 is preferably supported by a forked brace 66 which is supported at its lower end on the axle of the rear wheel. The brace 66 extends upwardly and rearwardly to a point adjacent the rear end of the luggage carrying frame 63. At its rear end, the luggage carrying frame 63 may be provided with a rounded enlargement 67 (see Fig. 1) to receive a tail-light or a reflector 68 serving in place of a tail-light.

From the above description, it will be apparent that I have provided a bicycle the parts of which are so shaped as to give the bicycle a streamline appearance suggesting the strength thereof without great weight and providing a comfortable, easy-riding position for the operator. The top member 22 is shaped in a novel manner at its forward end to include a headlight, and is also so constructed that a horn may be enclosed therein and a speedometer may be located in the top surface thereof. The bicycle thus is completely equipped as to accessories which are included in a manner providing a finished appearance. The frame, by virtue of the tapering shape of the top member and its rearwardly sweeping form together with the relation of the front and rear forks to the wheels gives the streamline effect as well as providing a sturdy construction. The location of the seat post gives ease in riding and permits the saddle to be mounted down close to the frame.

I claim:

1. In a bicycle, a frame including a pair of rear wheel forks, one of said forks extending downwardly and rearwardly and the other fork extending horizontally rearwardly and meeting the first fork adjacent the rear edge of the rear wheel, and a U-shaped member extending around the rear edge of the rear wheel and having each of its ends secured to each fork to rigidly connect the forks.

2. In a bicycle, a frame including a pair of rear wheel forks, one of said forks extending downwardly and rearwardly and the other fork extending generally horizontally rearwardly and meeting the first fork adjacent the rear edge of the rear wheel, and a U-shaped member extending around the rear edge of the rear wheel and having each of its ends secured to each fork to rigidly connect the forks, and a mud-guard secured at its rear end to said U-shaped member and extending over the wheel within both forks with its front end secured to the horizontally extending fork.

3. In a bicycle, a frame including a pair of rear wheel forks, one of said forks extending downwardly and rearwardly, and the other fork extending horizontally rearwardly and meeting the first fork adjacent the rear edge of the rear wheel, and a connecting member extending around the periphery of the rear wheel and having two forwardly projecting ends, said member being provided at each of its ends with a plurality of securing portions, each portion being secured to an end of a fork in order to rigidly connect the ends of each fork to one another and to the other rear wheel fork.

4. In a bicycle, a frame including a pair of rear wheel forks, one of said forks extending downwardly and rearwardly, and the other fork extending horizontally rearwardly and meeting the first fork adjacent the rear edge of the rear wheel, and a connecting member extending around the periphery of the rear wheel and having two forwardly projecting ends, said member being provided at each of its ends with a plurality of securing portions, each portion being secured to an end of a fork in order to rigidly connect the ends of each fork to one another and to the other rear wheel fork, and a mudguard secured at its rear end to said connecting member.

5. In a bicycle, a frame including a pair of rear wheel forks, one of said forks extending downwardly and rearwardly, and the other fork extending horizontally rearwardly and meeting the first fork adjacent the rear edge of the rear wheel, a connecting member extending around the periphery of the rear wheel and having two forwardly projecting ends, said member being provided at each of its ends with a plurality of securing portions, each portion being secured to an end of a fork in order to rigidly connect the ends of each fork to one another and to the other rear wheel fork, and a mudguard secured at its rear end to said connecting member and extending over the wheel within both forks with its front end secured to the horizontally extending fork.

6. In a bicycle, a frame including a pair of rear wheel forks, one of said forks extending downwardly and rearwardly, and the other fork extending horizontally rearwardly and meeting the first fork adjacent the rear edge of the rear wheel, a connecting member extending around the periphery of the rear wheel and having two forwardly projecting ends, said member being provided at each of its ends with a plurality of projections, each projection entering an end of a fork in order to rigidly connect the ends of each fork to one another and to the other rear wheel fork.

JOHN R. MORGAN.